July 22, 1969  C. H. SNOW  3,456,919
PALLET POSITIONER FOR AIRCRAFT CARGO HANDLING SYSTEM
Filed Nov. 14, 1966  3 Sheets-Sheet 1
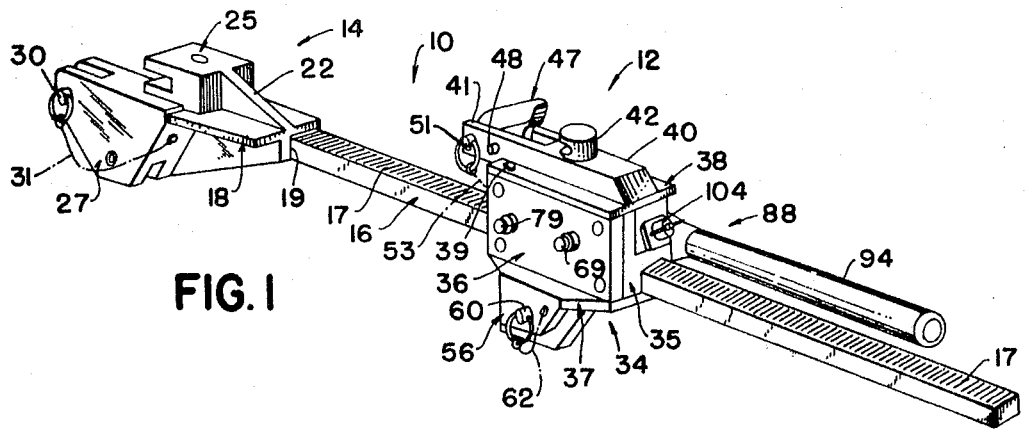
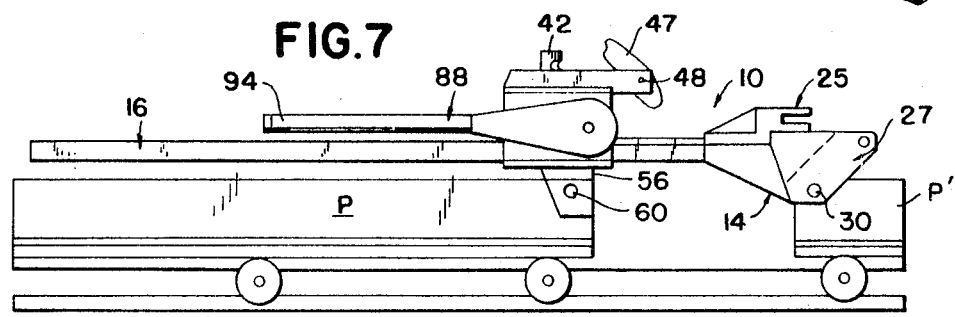
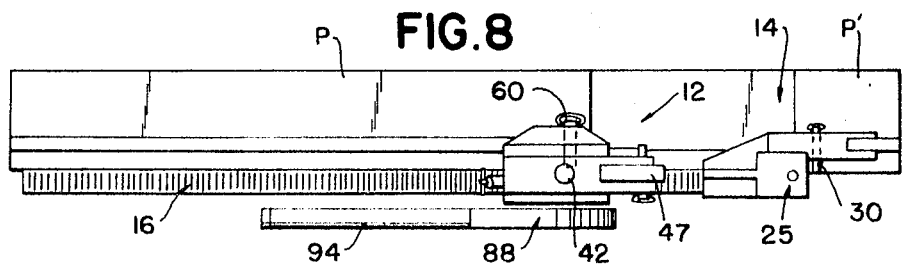
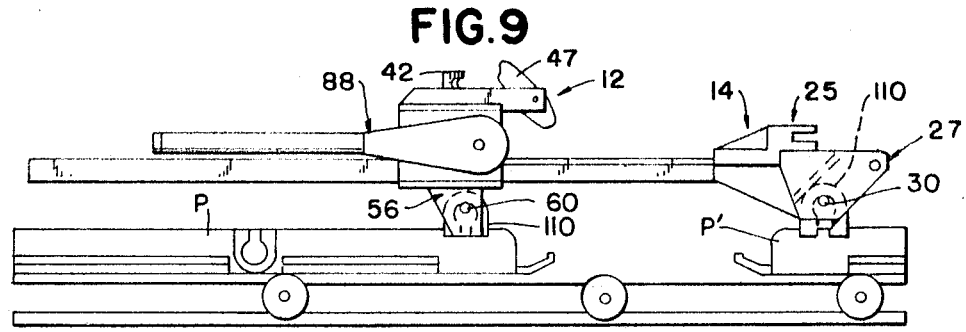
*INVENTOR.*
CONLEY H. SNOW
BY Whittemore, Hulbert &
Belknap
ATTORNEYS July 22, 1969
C. H. SNOW
3,456,919
PALLET POSITIONER FOR AIRCRAFT CARGO HANDLING SYSTEM
Filed Nov. 14, 1966
3 Sheets-Sheet 2
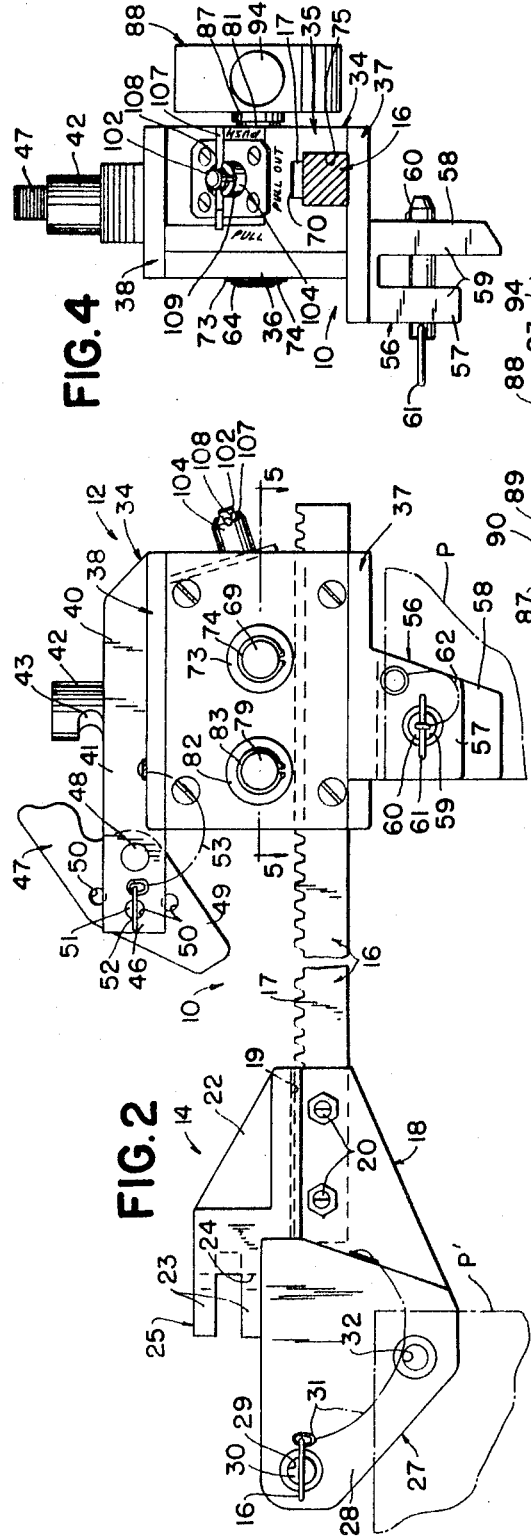
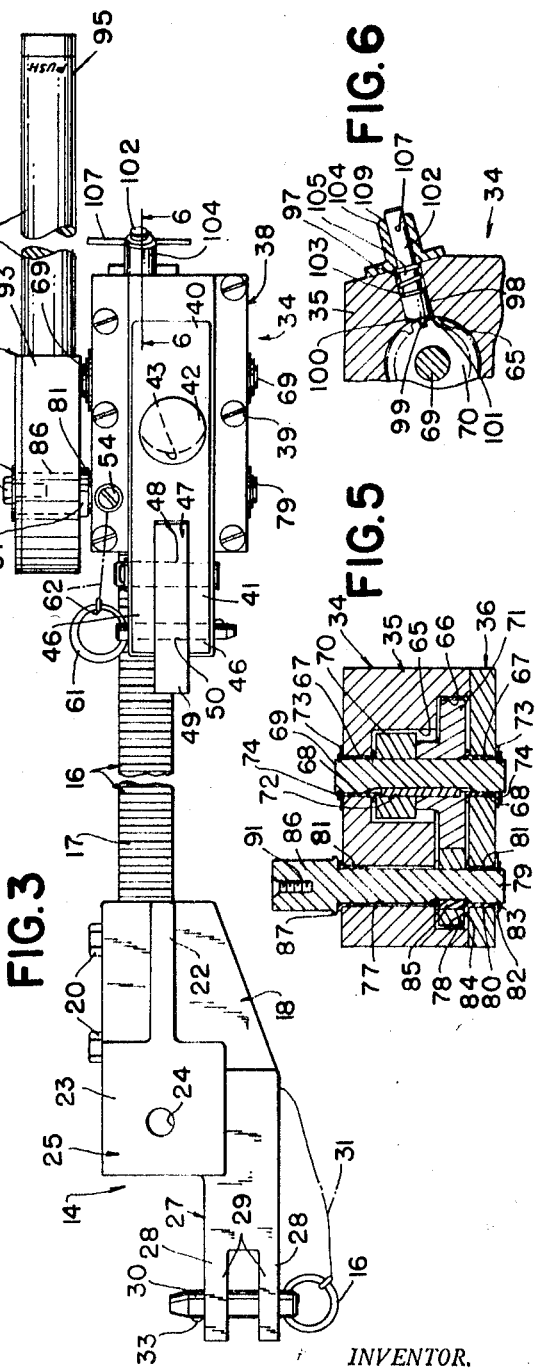
INVENTOR.
CONLEY H. SNOW
BY Whittemore, Hulbert & Belknap
ATTORNEYS

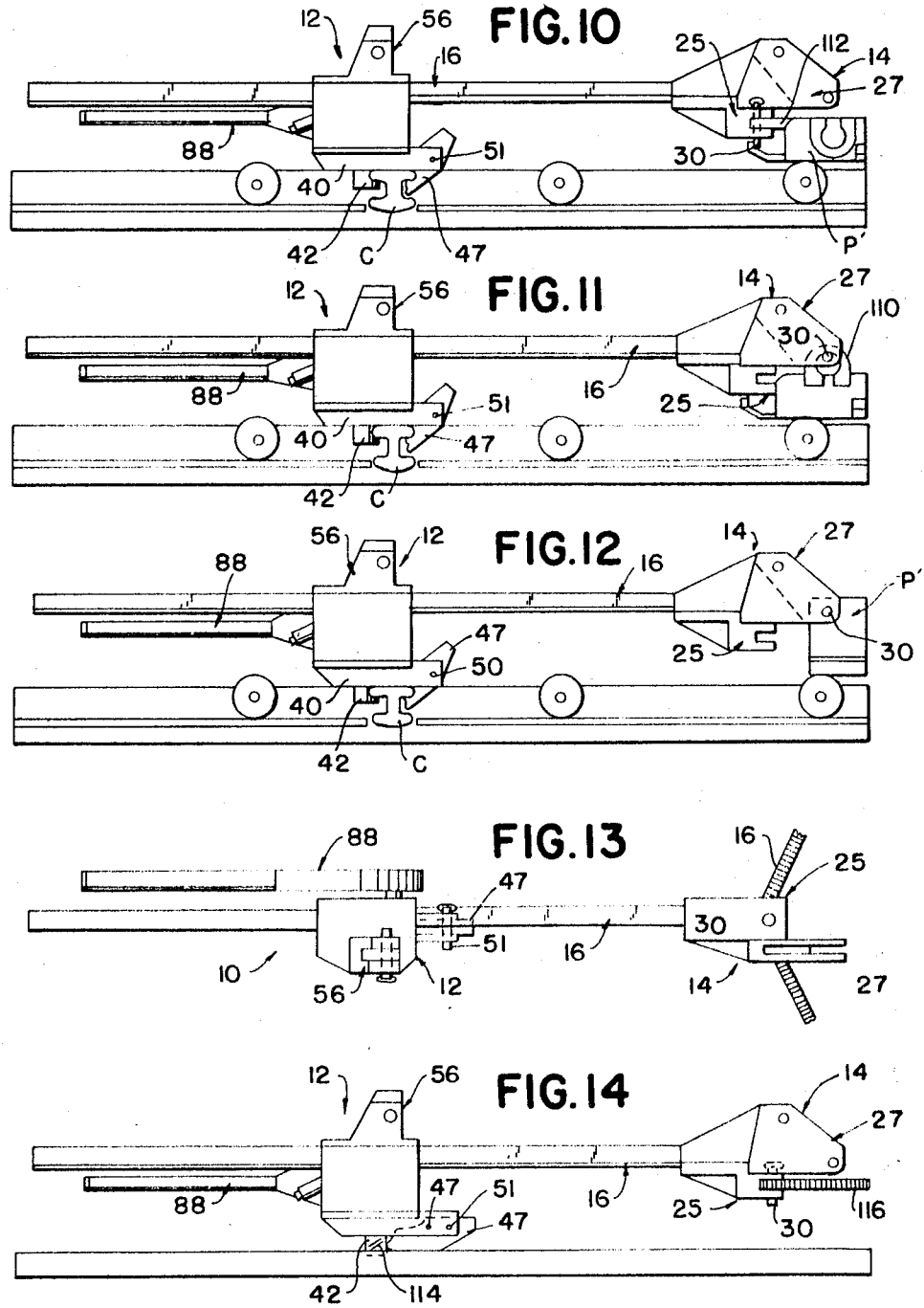

United States Patent Office 3,456,919
Patented July 22, 1969

3,456,919
PALLET POSITIONER FOR AIRCRAFT CARGO HANDLING SYSTEM
Conley H. Snow, Royal Oak, Mich., assignor to Brooks & Perkins, Incorporated, Detroit, Mich., a corporation of Delaware
Filed Nov. 14, 1966, Ser. No. 593,982
Int. Cl. B66f 3/02
U.S. Cl. 254—95    9 Claims

ABSTRACT OF THE DISCLOSURE

A load positioner has a load coupling unit and an anchoring unit connected by a rack and pinion device. The device operated to shift a load at the coupling unit relative to a fixed support at the anchoring unit. Both units have differently conformed means selectively engageable with different conformations of load and fixed support.

---

The present invention relates to improvements in a mechanism for loading and accurately positioning modular cargo supporting platforms and/or pallets in the interior of a large cargo-type aircraft, such as is presently employed by the military for later in-flight or on-ground delivery of the cargo under the control of a cargo loading system of the craft. Such a system is the subject matter of a copending application of Mollon, Rykwalder and Pinchot, Ser. No. 282,008, filed May 21, 1963.

As illustrated in that application, the platforms, pallets or like load members are loaded from the rear of the aircraft onto an elongated roller-type conveyer, along each side of which extend parallel side restraining rails for the purpose of guiding the load members in their longitudinal movement on the conveyer, whether in being loaded or discharged under parachute drag or aground. Releasable pallet lock mechanisms are disposed at longitudinally spaced intervals along the outer side of each of the restraint rails, and each lock has a movable detent or dog which extends through an aperture in the rail for releasable locking engagement with a notch in an adjacent side of a pallet or platform. Customarily there are two or more such notches in the side of the load member, each engaged along at least one restraining rail leg by an individual locking dog.

Although the locks themselves constitute no part of the present invention, which deals only with a mechanism for quickly, easily and accurately positioning the load members between the rails to receive the locking dogs, it happens that, pursuant to the Mollon et al. application, the locks along one of the side rails are sequentially operated by a forward-located load master in lading a series of loads and in freeing the same for discharge; while the locks along the opposite restraining rail are operated under parachute drag in flight, or manually in the case of ground delivery.

In the day-by-day use of an aircraft cargo loading system of the sort described above, the air drop platforms may vary in length from 8 to 28 feet, supporting loads of up to 35,000 pounds. The pallets, which are of shorter length, nevertheless may carry loads of up to 10,000 pounds. While considerably lighter weights on load members of either type may well be positioned by unassisted manual effort with their side indent notches properly registered with the lock dogs along the respective restraint rails, considerable difficulty is encountered in attempting manually to position loads of 10,000 pounds and over. This is so even though the heavier loads are commonly laded with the help of a winch or other mechanical loader; it is still difficult (if not impossible) in a reasonable time and with reasonable effort to position the load pallet or platform with its detent notches in the necessary exact transverse alignment with the rail apertures and locks.

It is therefore an object of the invention to provide a positioning mechanism of relatively simple and very sturdy construction to assist a single loading operator in so positioning the pallets, this mechanism being manually operated quickly and with very little exertion.

More specifically, the cargo pallet or platform positioner of the invention embodies two operatively connected units. Of these, a first is an anchoring and operating unit releasably engageable with a suitable fixed support, which support acts as an anchor or reaction member in the operation of the positioner. This support, for example, may be a rigid cross member of the framework of the roller conveyer of the cargo system, or a floor-connected pallet tie-down ring, or in some instances a previously anchored pallet or platform.

The second unit of the positioner is operatively connected to the first unit in a manner such that upon manual operation of the latter the second unit will be moved longitudinally in one direction or another; and the second unit has means to releasably couple it to the load member, thus moving and accurately positioning the latter under force originating at the anchoring and operating unit.

As herein illustrated and described, an operating portion of the first or anchoring and operating unit of the positioner drives (with a stepped up power ration) a gear meshing with an elongated rack bar or rod, which bar connects to the second or pallet-coupling unit of the positioner. However, other types of reversibly acting power-applying unit are contemplated, usually incorporating a rigid connecting member for push or pull movement of the load.

It is another object of the invention to provide a positioning mechanism including a coupling unit releasably connectible to the load-supporting member, pallet or platform, and a second unit also releasably engageable with a fixed support to serve as an anchor, as well as to move the load, in which at least one of said units, and preferably both thereof, has means for effecting the stated connections in different optional or selective positional relationships to the load member and/or support. This affords a considerable versatility of use of the positioner in the moving of load members into place.

For example, a fixedly anchored, ratchet-type operating unit may, by means of the selective provisions thereof, be engaged against a fixed support in either of two optional ways, or may be differently engaged with different types of support. Thus the support may be a fixed frame crosspiece or a fixedly anchored pallet or platform serving as a reaction support. By the same token, the pallet-engaging unit of the positioning mechanism may be optionally engaged in different ways with the load member or pallet which is to be moved into desired position. By reason of these selectively available connecting features a loading operator has a wide variety of ways in which he may utilize the positioner, depending upon the conditions which individually arise in the lading operation.

Still more specifically, the selective means for connecting the two units to a fixed support and to a pallet to be positioned, respectively, are of a quick-release type, enabling the positioning operation to be performed expeditiously, as well as easily. For certain purposes, the quick-release feature employs one or more differently oriented clevises on the respective units, with a removable pin to complete a clevis connection to the fixed support or to the load member. As an option, for example, when the fixed support is a frame member or a floor tie-down ring, the quick-release connection is effected at relatively fixed and movable jaws, the latter of which has removable pin means for holding it in operative relation to the fixed jaw.

In general, it is an object of the invention to provide an aircraft cargo loading mechanism for the purpose described, which is, coupled with its simplicity and compactness, of very light weight, hence easily transportable from position to position as the loading operation proceeds. By the same token, the positioner is readily reversed, position-wise, relative to the support and load member, in taking advantage of its optionally available means to effect quick-release connections to the support and load member.

The foregoing, as well as other objects, will become more apparent as this description proceeds, especially when considered in connection with the accompanying drawings illustrating the invention, wherein;

FIG. 1 is a perspective view of the improved positioner mechanism;

FIG. 2 is a side elevational view, partially broken, of the mechanism, schematically indicating in dot-dash line a typical operational connection of the positioner to a pallet or platform being moved and to a fixed support, here depicted as being a previously anchored load member;

FIG. 3 is a top plan view, partially broken, of the mechanism;

FIG. 4 is an end elevation of the positioner, as from the right of FIGS. 2 and 3;

FIG. 5 is a view in horizontal cross section along line 5—5 of FIG. 2, illustrating the gear housing and internal gear and pinion means of a ratchet-type operating device associated with the unit of the positioner which anchors the latter to a fixed support;

FIG. 6 is a view, in vertical cross section on the line 6—6 of FIGS. 3 and 4, of a selectively positionable pawl associated with the operating device for optional push or pull actuation of the latter;

FIG. 7 is a very schematic side elevational view of the improved positioning mechanism, as operatively connected in one optional manner contemplated by the invention (also depicted in FIG. 2) between a previously anchored platform, load member or carrier and a carrier or member to be moved;

FIG. 8 is a top plan view of the coupling arrangement of FIG. 7;

FIG. 9 is a schematic side elevational view of an alternative connecting arrangement, using an anchored platform as a fixed support;

FIGS. 10, 11 and 12 are schematic side elevational views of still other selective couplings between a fixed support, provided by the cargo system in one way or another, and a load carrier to be moved into place, it being noted that these arrangement involve a 180° inversion of the positioner from its position appearing in FIGS. 7 and 9;

FIG. 13 is a schematic top plan view of still another alternative mode of connecting the positioning mechanism to a load to be moved, in this instance through the agency of an auxiliary chain; and FIG. 14 is a side elevational view of the arrangement depicted in FIG. 13.

As illustrated in assembled form in FIGS. 1, 2, 3 and 4, the improved pallet or platform load-positioning mechanism of the invention, generally designated by the reference numeral 10, comprises two main components, i.e., an anchoring and operating unit 12 adapted to be engaged against a suitable fixed support in any of the various ways to be described, and a bracket-like coupling unit 14 which is provided with an elongated rack bar 16 as, in effect, a fixedly associated unitary part thereof.

As operatively connected at unit 14 between a pallet, platform or load member to be moved P (hereinafter designated in the main by the latter term) and the unit 12, the rack bar 16 extends longitudinally in general parallelism with the side restraining rails R (FIGS. 7–14) of the aircraft cargo system, between which rails the load members P are guided for movement on a roller conveyor structure S. Rack bar 16 is of steel in, say, an approximately 40" length, and is provided on its upper surface, as viewed in FIGS. 1 and 2, with the usual teeth 17.

At one end thereof, rack bar 16 is fixedly connected to a main body portion 18 of the coupling unit 14, for example in a vertically downwardly opening, longitudinal bottom channel 19 of the body, being rigidly secured in this channel by a pair of horizontal bolts 20.

The coupling unit 14 is preferably in the form of an aluminum alloy casting, for lightness in weight along with adequate strength, being braced at its top by a triangular web 22; and directly forwardly adjoining this web, the body 18 is formed to provide a horizontally disposed clevis formation, including vertically spaced arms of flanges 23 which have aligned vertical openings 24 therein to removably receive a coupling pin, hereinafter referred to.

The horizontal clevis is generally designated 25, and the coupling unit 14 is formed at a side thereof directly adjoining clevis 25 to provide a second, vertically disposed clevis 27, including a pair of horizontally spaced clevis arms 28 having horizontally aligned openings 29 for the removable reception of a clevis pin 30 in making one type of coupling to a load member. The pin 30 is provided at one end with a pivoted manipulating ring 16, and the pin is safeguarded against loss or misplacement by a length of chain 31 connected to the ring and fastened by a screw to the opposite side of clevis 27. The arms 28 of clevis 27 are provided with further aligned transverse openings 32 adjacent the bottom thereof to enable a different type of load coupling, as will be discussed in connection with FIGS. 7–14, inclusive; and it will be understood that the single clevis pin 30 is employed in coupling the unit 14 in one way or another to a load member at the vertical clevis portion 27 or the horizontal clevis portion 25. In order to mildly resist withdrawal from the coupling position thereof in the clevis arms, the pin 30 is provided at its end opposite ring 16 with a known type of spring-urged ball detent 33.

The anchoring and operating unit 12 of the mechanism 10 includes a composite gear housing and mounting structure, generally designated 34, of four-part construction, and also, like unit 14, by preference having its four component parts fabricated of an aluminum alloy. Housing 34 comprises a block-like gear housing body 35 (FIGS. 1, 4 and 5) which is bored and counterbored in a manner to be described; a side closure plate 36 of the same rectangular elevation as body 35, and rigidly secured by four screws to that side; a special bottom clevis plate 37 bolted or screwed upwardly across the bottom of the housing body 35 and the side plate 36; and a special top plate 38 secured from above onto the upper surface of the housing members 35, 36 by six screws as shown in FIGS. 1 and 3.

The housing plate 38 is provided along its top with an integral, longitudinally extending boss or enlargement 40. This is centered on the plate and projects substantially beyond one end thereof at a forked portion 41 of the boss; and boss 40 is further formed integrally, at its top rearwardly of its fork 41, to provide a fixed latching lug or jaw 42, which jaw has a concave arcuate seat 43 curving across the forward width thereof.

The projecting fork portion 41 of plate boss 40 is, as appears in FIGS. 1 and 3, in the nature of a vertically disposed clevis defined by parallel, horizontally spaced arms 46; and a quick-release latching jaw 47 is pivotally mounted within arms 46 medially of its length, as by means of a fixed transverse pin 48 which is headed at one end and held in place at its other end by a cotter pin (FIG. 3). Jaw 47 is counterweighted, at the end 49 thereof opposite its end facing fixed jaw 42, to swing in a counterclockwise sense about its pivot at pin 48; and it coacts with the fixed jaw in anchoring the mounting and operating unit 12 in some of the optional ways contemplated by the invention, per FIGS. 7 through 14.

In order to latch or lock the swinging jaw 47 in one of three different positions, the jaw is provided with three through-openings 50 disposed on a circumferential locus arc about an axis represented by pivot pin 48; and the latching jaw 47 is adapted to be held in any one of the three positions by a ball-detent type of transverse latching pin 51, similar to the coupling pin 30. In order to manipulate and prevent loss of this pin, it is equipped with an end ring 52 restrained by a chain 53 from a fixed screw connection on top plate 38.

The bottom plate 37 of gear housing 34 is, as illustrated in FIGS. 2 and 4, provided with an integral, downwardly facing clevis 56, made up of a shorter vertical arm 57 and a longer parallel arm 58, the arm 57 depending from a side boss of bottom plate 37. Clevis arms 57, 58 have aligned transverse openings 59 (FIGS. 2 and 4) to releasably receive a ball detent-type coupling pin 60 which, like the others, has a manipulating ring 61 and is protected against loss or misplacement by a chain 62 connecting ring 61 to a screw anchor on clevis arm 57.

As best illustrated in FIG. 5, considered in conjunction with FIGS. 2 and 3, the block-like body 35 of the gear housing 34 is provided with a horizontally disposed, cylindrical bore 65; and a wider counterbore 66 adjoins the bore 65 adjacent the housing side closure plate 36. Body 35 and plate 36 are provided with aligned cylindrical holes 67 coaxial with bore 65, which holes receive fixed bushings 68 to journal a transversely extending output shaft 69; and this shaft has a pinion 70 fixedly secured thereon, as well as a coaxial, larger diameter intermediate gear 71 adjoining the same, by means of a key 72. It is thus that pinion 70 and gear 72 rotate as a cluster unit, the pinion in the body bore 65 and the gear in the counterbore 66. Shaft 69 is held against axial displacement by a large washer 73 and a split ring 74 at each of its opposite ends.

As illustrated in FIG. 4, the body 35 of gear housing 34 has a longitudinally extending opening or slot 75 of rectangular cross section at the bottom thereof, directly above the bottom clevis plate 37. This slot slidably receives the rack bar 16, with the teeth 17 of the latter in mesh with those of pinion 70 in the zone in which slot 75 subtends the housing bore 65 from beneath.

The body 35 of the gear housing is provided with a second transverse cylindrical bore 77 paralleling and spaced from the pinion-receiving bore 65, the bore 77 opening to an extended side portion 78 of the body counterbore 66 (FIG. 5). An input or drive shaft 79 is received coaxially in bore 77, as well as in a further bore 80 in side plate 36 aligned with bore 77. The drive shaft 79 is journaled in bushings 81 disposed in the respective bores 77, 80; and shaft 79 is held axially in place by a washer 82 and a split ring 83 external of housing side plate 36. A small diameter power input pinion 84, disposed in counterbore portion 78 and in mesh with gear 71, is drivingly connected to shaft 79 by means of a key 85.

Drive shaft 79 extends outwardly of the side housing body 35 remote from pinion 84, being provided with an enlarged cylindrical hub formation 86, at which ratcheting drive action is transmitted to shaft 79. This drives the train of gearing 84, 71 and 70 to impart longitudinal motion to rack bar 16. Hub 86 has an enlarged shoulder 87 which runs against the end of the adjacent drive shaft bushing 81.

Now referring to FIGS. 2, 3 and 4 in conjunction with FIGS. 5 and 6, a conventional type of reversible ratchet-type operating device, generally designated by the reference numeral 88, is operatively coupled to the drive shaft hub 86 in a known manner, being held axially in place on this hub by means of an enlarged washer 89 and a bolt 90 threaded into a tapped axial opening 91 of the hub 86. Ratchet device 88 includes a chambered body 93 encasing the usual pawl and ratchet components (not shown) of the device in a known manner; and these components drive the power input shaft 79, upon oscillatory manipulation of an operating arm 94 of ratchet device 88.

The latter is of a type in which the direction of rotative transmission of ratcheting or indexing effort may be reversed by simply rotating the operator arm 94 through 180° about its own axis. Hence, to designate the direction, the arm 94 is marked at 95 with the word "PUSH" on one side thereof and "PULL" on the opposite side thereof, so that an operator may be aware of the direction that rack bar 16 will move when arm 94 is oscillated by him.

For coaction in the bi-directional operation of ratchet device 88, reference being now had in particular to FIG. 6 in conjunction with FIG. 4, the housing body 35 is provided with a small cylindrical bore 97 opening radially to bore 65 at one end and to the exterior of the housing at the other end. Bore 97 slidably receives a short cylindrical pawl 98 which has at its inner extremity a detent nose 99. This nose is formed to provide a flat stop surface 100 on the axis of the pawl and an arcuate cam surface 101 extending convexly from surface 100 to the cylindrical periphery of pawl 98, for a purpose to be described.

The pawl has an integral cylindrical stem 102 extending outwardly of a pawl shoulder 103, this stem being slidably guided in the bore of a flanged tubular retainer 104 which is fixedly held to an outer surface of housing body 35 by four screws (FIG. 4); and the pawl 98 is urged radially inwardly into engagement with the teeth of the rack bar actuating pinion 70 by means of a coil compression spring 105 acting between pawl shoulder 103 and the retainer 104, as appears in FIG. 6.

Adjacent its outer end the pawl stem 102 carries a transversely extending selector and manipulating pin 107, which, as shown in FIG. 4, extends a considerable distance on opposite sides of the stem. The retainer 104 is formed at its outer end to provide two pairs of aligned slotted seats 108 and 109, the former of which are considerably deeper than the latter. Pin 107 may be received, in either of two optional ratcheting positions of pawl 98, in the deeper seats 108, and the pin is of sufficient length to overlie the flange of retainer 104, so that it may be conveniently grasped by operators' fingers in order to draw pawl 98 radially outwardly against the force of spring 105, rotate it 180° and re-engage pin 107 in the retainer slots. As appears in FIG. 6, this occasions a reversal of the position of pawl nose 99. When it is desired to permit pinion 70 to free-wheel in both directions the pawl 98 is drawn fully outward and the manipulating pin 107 is lodged in the shallow retainer seats 109.

For convenience (FIG. 4), the outer surface of housing body 35 is marked "PUSH," "PULL" and "PAWL OUT," and the pin 107 will have a suitable indicator mark or pointer, thus enabling the operator to visually ascertain that the pawl 98 is set for a push stroke or a pull stroke of ratchet bar 16, or as operably disabled. It is seen that, with the pawl 98 set in the position of FIG. 6, the rack drive pinion 70 may rotate counterclockwise against pawl cam surface 101, being restrained by surface 100 against clockwise movement. The operating arm 94 of ratchet unit 88 will show a "PUSH" or "PULL" indication corresponding to that appearing on the exterior of the housing body 35.

It is believed that the operation of the positioner 10 will be evident to those skilled in the art from the above description. Oscillating actuation of the ratchet arm 94 results in the transmission of longitudinal indexing force to rack bar 16 in one longitudinal direction or the other, under a multiplied force ratio due to the train of ratchet-driven gearing, including the small diameter input pinion 84, the larger diameter intermediate gear 71 and the small diameter output or driivng gear 70; and the load member is correspondingly indexed powerfully and optionally as to direction through the agency of the rack-connected coupling unit 14 of the positioner.

FIGS. 7 through 14 of the drawings illustrate a number of different ways in which the positioner 10 may be presented to a fixed support of one sort or another and to the load member in order to provide great versatility of adaptation to different situations, location or space factors, etc., which may arise in lading an aircraft interior equipped with a cargo system in general accordance with what is shown in the above-entitled application of Mollen et al.

Thus, FIGS. 2, 7 and 8 show an arrangement in which a previously anchored pallet or platform P is itself employed as an anchor for the moving by positioner 10 of another platform or pallet P'. In this arrangement, the positioner is oriented vertical-wise in the same manner as shown in FIG. 2, i.e., with the clevis 25 of coupling unit 14 and the plate boss 40 of the anchoring and operating unit 12 disposed upwardly. Pursuant to the FIGS. 7 and 8 arrangement, the then downwardly facing clevis 27 of unit 14 is coupled by the pin 30 to the pallet P' at a suitable hole formed in the latter. Similarly, the downwardly disposed clevis 56 of the unit 12 is coupled by its pin 60 in a hole in the fixed, anchoring pallet P. An oscillation of the ratchet arm 94 produces the desired indexing movement in one direction or another of the movable pallet.

As an alternative, FIG. 9 shows the positioner 10 in the same position as in FIGS. 2, 7 and 8, but with the clevises 27 and 56 of the respective units 14 and 12 engageable by their respective pins 30, 60 in rings 110 on the fixed and movable pallets P, P', respectively.

In the illustrative use shown in FIG. 10, the positioner 10 is inverted 180° from the position of FIGS. 7 and 9, with the fixed jaw 42 and the movable jaw 47 of the unit 12 disposed downwardly, likewise the horizontal clevis 25 of coupling unit 14. As so disposed, the jaw 42 is hooked around one flange of a rigid crosspiece C of the conveyor roller supporting framework of the system, and the movable jaw 47 is swung into engagement with an opposite flange of the crosspiece, then latched in this position by pin 51. Likewise, the horizontal clevis 25 of load coupling unit 14 is straddled on a projecting horizontal flange 112 of the movable pallet or platform P', for the positioning of the latter in one direction or the other, in this case using the conveyor framework as an anchor or reaction member.

FIG. 11 represents a slight modification of the arrangement of FIG. 10, differing therefrom only in that the coupling unit 14 is locked to a pallet or platform ring 110 at its vertically disposed clevis 27, rather than at its clevis 25. In still another adaptation, per FIG. 12, the coupling of unit 14 to the movable trolley P' is also through the clevis 27, but at a hole in pallet P', rather than at a pallet ring.

FIGS. 13 and 14 represent a still further possibility in the use of positioner 10. Here the movable jaw 47 of unit 12 is latched in a horizontal position by the locking pin 51, after the fixed jaw 42 has been engaged into a floor tie-down ring 114, such as is common to the system in question. This effects a firm anchor, and the load coupling unit 14 may then be suitably connected to the movable platform in any of the ways referred to above.

As a still further extension of the versatility of the positioner, in the event it is found desirable to connect to the movable pallet at a more central location, a strong flexible chain 116 may be attached at its opposite ends to rings on either side of the load member, with the coupling unit 14 engaging the chain at a more or less central location between its ends. The horizontally disposed clevis 25 and the clevis pin 30 are employed for that purpose.

It is seen from the foregoing that the invention affords a compact, light but strong, inexpensively produced, and quickly and easily manipulated positioning mechanism for use as an adjunct to my cargo loading system similar to that of the Mollon et al. application identified above. Being in the main of aluminum alloy construction, save for wear sustaining parts, it is readily transportable back and forth within the aircraft cargo interior. It has been found that the positioner is a practically indispensable tool for the accurate positioning of heavy pallet loads in relation to the locks and side restraining rails of a Mollon et al. installation.

What I claim is:

1. A positioner of the type described, comprising a coupling unit adapted for releasable connection to a load or load supporting member to move the latter longitudinally, an anchoring and operating unit connectible to a fixed support, said last named unit being adapted to serve as an anchor for and to occasion said movement of said coupling unit and member, said anchoring and operating unit having means for manually operating a movable part of the same, and means operatively connecting said coupling unit rigidly to said anchoring and operating unit through said part of the latter, thus to move said load member longitudinally, upon manual actuation of said operating means, under force transmitted through said connecting means in either longitudinal direction, said coupling unit and said anchoring and operating unit each having means of different configuration selectively engageable in different relationships to a load supporting member and a fixed support, respectively, thus to adapt the positioner for use in connection with different load members and supports.

2. The positioner of claim 1, in which said part of said anchoring and operating unit comprises a pinion rotatable in increments in either direction, said connecting means comprising an elongated rack member having teeth meshing with said pinion, said rack member being operatively connected to said coupling unit to move the latter.

3. The positioner of claim 1, in which said selectively engageable means includes means associated with at least a part of said selectively engageable means for effecting a quick-release locked connection of said unit to the support.

4. The positioner of claim 2, in which said selectively engageable means includes means associated with at least a part of said selectively engageable means for effecting a quick-release locked connection of said unit to the support.

5. The positioner of claim 1, in which certain of the selective engagements of the units are had by a movement of the positioner as a whole, said units in any adjusted position relative to one another being in fixed relation to said connecting means.

6. The positioner of claim 5, in which said selective engagements are had at least in part by bodily shifting the positioner angularly about an axis generally parallel to the line of longitudinal movement of the load member.

7. A load positioner mechanism for an aircraft cargo handling system, comprising an operating unit and a coupling unit, means for releasably connecting one of said units to a load in an aircraft cargo interior to be positioned in the latter with the assistance of said mechanism, means for releasably connecting the other unit to a fixed support in said interior which is adapted to act as an anchor for said movement, and rigid means operatively connecting said units to one another in such manner that force is transmitted through said connecting means to a load engaged by said coupling unit to move said load longitudinally in said interior upon actuation of said operating unit, said coupling unit and said anchoring and operating unit each having means of different configuration selectively engageable in different relationships to a load supporting member and a fixed support, respectively, thus to adapt the positioner for use in connection with different loads, and supports.

8. The load positioner of claim 7, in which said operating unit has ratchet-type means operatively connected to said connecting means to move the latter in an indexing manner.

9. The load positioner of claim 7, in which said ratchet-type means is reversibly operable, whereby said force is transmitted, and said load is moved selectively in either longitudinal direction.

References Cited

UNITED STATES PATENTS

| | | | |
|---|---|---|---|
| 1,011,019 | 12/1911 | Bomhoff | 254—97 X |
| 1,365,656 | 1/1921 | Burns | 254—133 |
| 1,395,123 | 10/1921 | Leopold | 254—95 |
| 1,883,538 | 10/1932 | Bywater | 214—516 |
| 2,473,109 | 6/1949 | Schneider | 254—35 |
| 2,938,706 | 5/1960 | Langen | 254—106 |
| 3,031,167 | 4/1962 | Roussel | 254—105 |
| 3,044,747 | 7/1962 | Nolden | 254—134 X |
| 3,259,365 | 7/1966 | Gibson | 254—95 |

OTHELL M. SIMPSON, Primary Examiner